A. LAW.
BOLT ANCHOR.
APPLICATION FILED OCT. 13, 1913.

1,119,843.

Patented Dec. 8, 1914.

Witnesses:
William Miller
Chris H. Amstutt

Inventor
Albert Law
By his Attorneys
Hauff & Harland

UNITED STATES PATENT OFFICE.

ALBERT LAW, OF BROOKLYN, NEW YORK.

BOLT-ANCHOR.

1,119,843.  Specification of Letters Patent.  Patented Dec. 8, 1914.

Application filed October 13, 1913. Serial No. 794,831.

*To all whom it may concern:*

Be it known that I, ALBERT LAW, a citizen of the United States, residing at Brooklyn, county of Kings, State of New York, have invented new and useful Improvements in Bolt-Anchors, of which the following is a specification.

This invention relates to a bolt-anchor which is essentially designed for securing a screw bolt into a socket or hole formed in stone or wood.

The device consists of a sleeve formed of soft metal such as lead or malleable iron, having a series of shanks provided with segmental contracted members integrally united to the neck of the shell. The sleeve has a threaded or tapered bore so that when a bolt is inserted the shanks will spread, thus holding the bolt and sleeve to the article. The sleeve is cast in one piece and being flexible the shanks when expanded will bend at the contracted portions only, thereby insuring positive grip of the bolt with the bore of the sleeve.

In casting the sleeve the shanks are spread so that any design of thread or tapered bore can be molded in one process and the core of the mold can be readily removed. This principal of an open sleeve when casting permits it to have back drafted or ratchet teeth cast in the bore and then collapsed after cooling. This method of casting leaves its own core. The teeth can also be of the same depth throughout the bore so that all the teeth will be adapted to engage the bolt. The method of casting also makes it possible to split the sleeve in three or more parts thus forming a plurality of shanks close together and giving greater expansion sur face. This method of fitting the split portions of the shanks close together makes it possible to cast a small size sleeve with three or more shanks so as to give better expansion and holding power to the sleeve.

Figure 1:
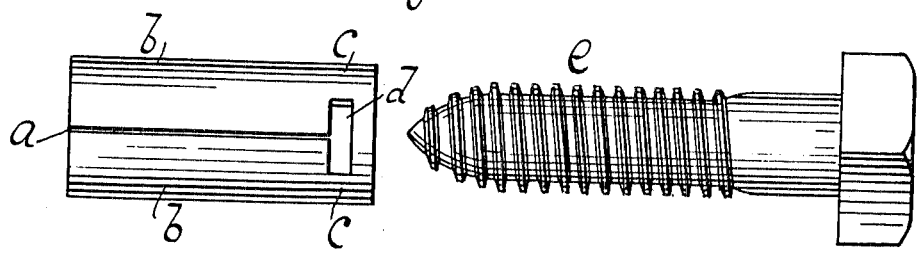
Figure 2:
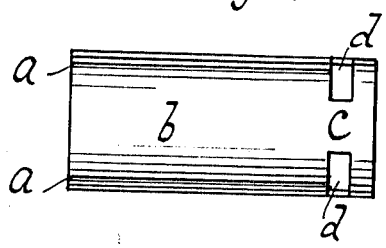
Figure 3:
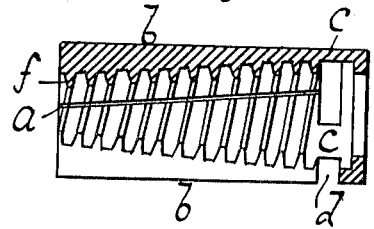
Figure 4:
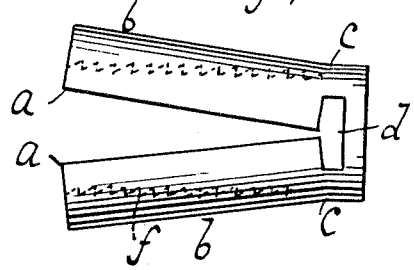
Figure 5:
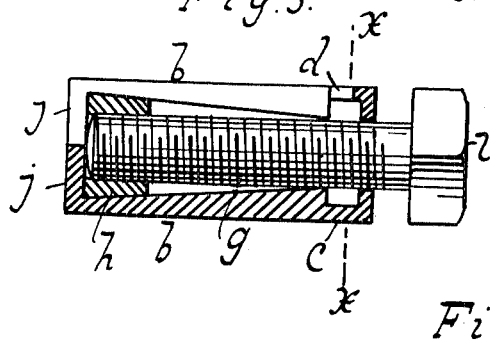
Figure 6:
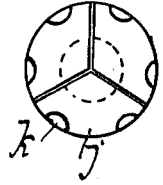
Figure 7:
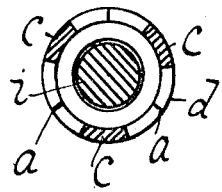
Figure 8:
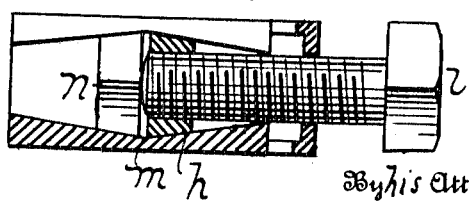

The invention is more fully described in the following specification and claims and illustrated in the accompanying drawings in which:

Figure 1 represents a side elevation of a sleeve and a bolt embodying this invention. Fig. 2 is a side elevation of a sleeve at a different angle from Fig. 1. Fig. 3 is a vertical longitudinal section of the same. Fig. 4 is a side elevation showing the shank members spread. Fig. 5 is a vertical longitudinal section of a modification. Fig. 6 is an end view of the same. Fig. 7 is a section along the line $x$ $x$ of Fig. 5. Fig. 8 is a vertical longitudinal section of a modification.

In this drawing is shown a sleeve which is provided with longitudinal split portions $a$ to form shank members $b$. Each shank member has a contracted segmental member $c$ for integrally uniting the shank to the neck of the sleeve. These contracted members are formed by casting the metal with slots or cutaway rectangular portions $d$ adjacent to the neck of the sleeve. The sleeve is shown with three shanks but it will be understood that there could be any number of shanks employed. The contracted segmental members $c$ are parallel to each other, that is to say the border lines of the slots are at right angles to each other. When the shanks are expanded by the insertion of a screw $e$ the line of bending for each shank will be along the contracted segmental member, thus giving each shank a flexible joint at the contracted portion.

As shown in Figs. 1 to 4 inclusive, the tapered bore of the sleeve is provided with screw threads $f$ preferably adapted for engagement with the threads of said screw $e$. The threads as indicated are formed in the bore by the process of casting the body of the sleeve thereby casting the whole of the sleeve in one operation.

As shown in Figs. 5, 6 and 7 the bore $g$ of the sleeve is tapered for engagement with a nut $h$ operated by a machine screw $i$. The rear end of the sleeve or each shank is provided with a toe piece $j$ to contact with the end of the screw. The screw in this construction when rotated will move the nut up the incline of the bore and thereby spread the shanks. The sleeve can also be provided with longitudinal channels $k$ as indicated in Fig. 6, to lighten the sleeve and give better grip of the periphery of the sleeve.

As shown in Fig. 8 the sleeve is provided with a double tapered bore $m$. In this device the machine screw $i$ engages a nut $h$ and a movable angular toe piece $n$. The screw in this device when rotated moves the nut toward the head of the screw and the toe piece $n$ in the opposite direction, so that the shanks will be uniformly opened and the pressure is equally distributed.

From the foregoing description it will be seen that the invention contemplates, a sleeve made of soft metal the shank portion of which has contracted segmental parallel members to constitute the pliant portions of the shank. By having the contracted members parallel and of approximately one-half the circumference of the shanks splitting and breaking of the parts is avoided.

I claim:

1. A bolt anchor comprising an interiorly threaded metallic sleeve for the insertion of a lag screw and provided with a series of shanks, each shank having a contracted flexible segment of smaller circumference united to the shank of the shell, said contracted segments forming rectangular slots in a circumferential line with the segments.

2. A bolt anchor comprising an interiorly threaded tapered metallic sleeve for the insertion of a lag screw and provided with a series of shanks, each shank having a contracted flexible segment of smaller circumference integral with the neck of the shell, said contracted segments forming rectangular slots in a circumferential line with the segments.

3. A bolt-anchor comprising an interiorly tapered metallic sleeve provided with toe portions, said sleeve consisting of a series of shanks having segmental members integrally united to the neck of the shell, said segmental members being of substantially one half the circumference of the shank.

4. A bolt anchor comprising an interiorly double tapered soft metal sleeve provided with a series of shanks having segmental parallel members united to the neck of the shell, said segments being about one-half of the circumference of the shank.

In testimony whereof I have hereunto set my hand in the presence of two subscribing witnesses.

ALBERT LAW.

Witnesses:
  CHRIS. H. AHNSTAEDT,
  HAZEL V. McELROY.